US005546335A

United States Patent [19]

Lee

[11] Patent Number: 5,546,335
[45] Date of Patent: Aug. 13, 1996

[54] ABSOLUTE VALUE CALCULATION METHOD AND CIRCUIT

[75] Inventor: Yong H. Lee, Seoul, Rep. of Korea

[73] Assignee: Goldstar Electron Co., Ltd., Choongchungbook-Do, Rep. of Korea

[21] Appl. No.: 357,009

[22] Filed: Dec. 16, 1994

[30] Foreign Application Priority Data

Oct. 18, 1994 [KR] Rep. of Korea .................. 26615/1994

[51] Int. Cl.⁶ .................. G06F 7/00; G06F 7/50
[52] U.S. Cl. ..................... 364/715.01; 364/788
[58] Field of Search .................. 364/715.01, 768, 364/784, 786, 787, 788

[56] References Cited

U.S. PATENT DOCUMENTS

| | | | |
|---|---|---|---|
| 5,084,835 | 1/1992 | Okamoto | 364/787 |
| 5,148,386 | 9/1992 | Hori | 364/715.01 X |
| 5,251,164 | 10/1993 | Dodson et al. | 364/715.01 |

Primary Examiner—Paul P. Gordon
Assistant Examiner—Chuong D. Ngo
Attorney, Agent, or Firm—Lowe, Price, LeBlanc & Becker

[57] ABSTRACT

8-bit absolute value calculation method and circuit. The circuit has first to eighth subtracters for subtracting a subtrahend from a minuend in the unit of bit, first to fourth signal selectors for selecting differences and borrows from the second, fourth, sixth and eighth subtracters, respectively, according to borrows from the first, third, fifth and seventh subtracters, fifth and sixth signal selectors for selecting differences and borrows from the second and fourth signal selectors, respectively, and differences from the third and seventh subtracters, respectively, according to borrows from the first and third signal selectors, a seventh signal selector for selecting differences and borrows from the sixth signal selector and differences from the fifth subtracter according to borrows from the fifth signal selector, an eighth signal selector for selecting differences from the first subtracter, differences from the first signal selector, differences from the fifth signal selector and differences and borrows from the seventh signal selector according to a higher-order one of the borrows from the seventh signal selector, and a signal calculator for calculating a difference from the eighth signal selector according to a most significant bit thereof to output an absolute value.

12 Claims, 6 Drawing Sheets

|A − B|

S = A−B

| A | B | Do | Bo | Di | Bi |
|---|---|----|----|----|----|
| 0 | 0 | 0  | 0  | 1  | 1  |
| 1 | 0 | 1  | 0  | 0  | 0  |
| 0 | 1 | 1  | 1  | 0  | 0  |
| 1 | 1 | 0  | 0  | 1  | 1  |

FIG. 7

| i | 7 | 6 | 5 | 4 | 3 | 2 | 1 | 0 | ASSUMED BORROW INTO EACH SECTION | STEP |
|---|---|---|---|---|---|---|---|---|---|---|
| Ai | 0 | 0 | 0 | 1 | 1 | 0 | 1 | 0 | | |
| Bi | 0 | 1 | 0 | 0 | 1 | 1 | 1 | 1 | | |
| Di0 | 0 | 1 | 0 | 1 | 0 | 1 | 0 | 1 | 0 | 1 |
| Bi0 | 0 | 1 | 0 | 0 | 0 | 1 | 0 | 1 | | |
| Di1 | 1 | 0 | 1 | 0 | 1 | 0 | 1 | 0 | 1 | |
| Bi1 | 1 | 1 | 1 | 0 | 1 | 1 | 1 | 1 | | |
| D'i0 | 1 | 1 | 0 | 1 | 1 | 1 | 1 | 1 | 0 | 2 |
| B'i0 | 1 | | 0 | | 1 | | 1 | | | |
| D'i1 | 1 | 0 | 0 | 0 | 1 | 0 | 1 | 0 | 1 | |
| B'i1 | 1 | | 0 | | 1 | | 1 | | | |
| D"i0 | 1 | 1 | 0 | 1 | 1 | 0 | 1 | 1 | 0 | 3 |
| B"i0 | 1 | | | | 1 | | | | | |
| D"i1 | 1 | 1 | 0 | 0 | 1 | 0 | 1 | 0 | 1 | |
| B"i1 | 1 | | | | 1 | | | | | |
| D'''i0 | 1 | 1 | 0 | 0 | 1 | 0 | 1 | 1 | 0 | 4 |
| B'''i0 | 1 | | | | | | | | | |
| D'''i1 | 1 | 1 | 0 | 0 | 1 | 0 | 1 | 0 | 1 | |
| B'''i1 | 1 | | | | | | | | | |
| D | 1 | 1 | 0 | 0 | 1 | 0 | 1 | 0 | | |
| 1 COMPLEMENT | 0 | 0 | 1 | 1 | 0 | 1 | 0 | 1 | | |

ABSOLUTE VALUE CALCULATION METHOD AND CIRCUIT

BACKGROUND OF THE INVENTION

1. Field of the Invention

The present invention relates in general to calculation of an absolute value of a difference between two integral numbers, and more particularly to 8-bit absolute value calculation method and circuit for obtaining the difference between the two integral numbers using a conditional subtracter and obtaining the absolute value directly from the obtained difference, resulting in improvement in a calculation speed, so that they can be applied to video and audio compression systems requiring a high-speed absolute value calculation operation.

2. Description of the Prior Art

Referring to FIG. 1, there is shown a block diagram of a conventional absolute value calculation circuit. As shown in this drawing, the conventional absolute value calculation circuit comprises a subtracter 10.1 for taking a complement of one of two input integral numbers A and B and adding the resultant value to the other integral number to obtain a difference between the two integral numbers A and B, an exclusive OR gate 102 for exclusive-ORing an output S of the subtracter 101 to take a one's complement thereof, and an adder 103 for adding "1" to an output of the exclusive OR gate 102 to obtain an absolute value of the difference between the two integral numbers A and B.

The subtracter 101 includes, as shown in FIG. 2, an exclusive OR gate 104 for exclusive-ORing the input integral number B to take a two's complement thereof, and an adder 105 for adding the input integral number A to an output of the exclusive OR gate 104 to obtain the difference S between the two integral numbers A and B.

The operation of the conventional absolute value calculation circuit with the above-mentioned construction will hereinafter be described.

In the case where the absolute value of the difference A–B between the two integral numbers A and B is to be obtained, the two's complement of the integral number B is taken and then added to the integral number A. Then, it is discriminated whether a most significant bit of the added value S is "1". If the most significant bit of the added value S is "1" the two's complement of the added value S is taken because the added value S is a negative (–) value. On the contrary, if the most significant bit of the added value S is "0", the added value S is directly used because it is a positive (+) value.

In the case where the above-mentioned method is to be performed by the circuit, when the two integral numbers A[0:7] and B[0:7] are inputted to the subtracter 101, the one's complement of the integral number B is taken by the exclusive OR gate 104 and then added to "1", resulting in the two's complement of the integral number B being taken. Then, the adder 105 adds the input integral number A to the two's complement of the integral number B. As a result, the difference (S=A–B) between the two integral numbers A and B is obtained by the adder 105.

The adder 105 is an 8-bit ripple carry adder, as shown in FIG. 3, which consists of 8 1-bit adders. In calculating 8-bit data, an output carry of a lower-order bit is transferred to an input carry of a higher-order bit up to a most significant bit. In this manner, the difference (S=A–B) between the two integral numbers A and B is obtained by the adder 105.

If the difference S between the two integral numbers A and B is the negative (–) value, the one's complement thereof is taken by the exclusive OR gate 102 and then added to "1" by the adder 103. As a result, the absolute value of the difference between the two integral numbers A and B is obtained by the adder 103.

For example, provided that A=2 and B=4, A–B=–2 and the absolute value thereof is "2". In this case, the integral numbers A and B can be expressed in binary 8-bit data form as follows:

A="00000010"

B="00000100"

The one's complement (/$B_1$=11111011) of the integral number B is taken by the exclusive OR gate 104 and then added to "1", resulting in the two's complement (/$B_2$=11111100) of the integral number B being taken. Namely, /$B_2$32 /$B_1$+1%.

Adding the integral number A to the two's complement /$B_2$ of the integral number B, the sum (S=A–B)=A+(–/$B_2$)= 11111110. In this case, because the most significant bit is "1" the difference A–B between the two integral numbers A and B is the negative (–) value.

To obtain the absolute value of the difference A–B between the two integral numbers A and B, the one's complement of the difference A–B is taken by the exclusive OR gate 102 as follows:

/(A–B)$_1$=00000001

Then, the adder 103 adds "1" to the one's complement of the difference A–B to take the two's complement thereof as follows:

$$/(A-B)_2 = /(A-B)_1 + 1 = 00000010 = 2$$

where, "2" is the absolute value.

However, the above-mentioned conventional absolute value calculation circuit has a disadvantage in that the difference S between the two integral numbers A and B is obtained by the 8-bit ripple carry adder requiring a long data calculation time because the carry is transferred from the lower-order bit to the higher-order bit. For this reason, to enhance the low-speed calculation operation of the 8-bit ripple carry adder, a high-speed conditional sum adder has mostly been used to be applicable to a high-speed signal processing system.

Although employing the high-speed conditional sum adder, however, the conventional absolute value calculation circuit has another disadvantage in that the subtraction operation is performed for the absolute value calculation by taking the two's complement of one of the input data, resulting in the increase in the number of the circuit components and in the calculation time. Further, at the final absolute value calculating stage, an inverter or the exclusive OR gate and the adder must be used to take the two's complement of the sum {A+(–B)} of the two integral numbers A and B according to a sign of the most significant bit thereof. This results in the increase in a chip area and in the calculation time.

SUMMARY OF THE INVENTION

Therefore, the present invention has been made in view of the above problems, and it is an object of the present invention to provide 8-bit absolute value calculation method and circuit in which a subtrahend is directly subtracted from a minuend without taking a two's complement thereof and an absolute value is obtained directly from a difference between the minuend and the subtrahend, so that a chip area can significantly be reduced and a high-speed operation can be performed.

In accordance with one aspect of the present invention, there is provided an 8-bit absolute value calculation method comprising the steps of (a) subtracting a subtrahend from a minuend in the unit of bit and calculating, according to borrows of each odd bit, differences and borrows of the subsequent even bit; (b) calculating, according to borrows of each odd bit being present after performing said step (a), differences and borrows of the subsequent two bits; (c) calculating, according to borrows of each odd bit being present after performing said step (b), differences and borrows of the subsequent four bits; (d) calculating a difference according to a borrow being present after performing said step (c) and discriminating whether a most significant bit of the calculated difference is "1"; and (e) taking a one's complement of the difference calculated at said step (d) to obtain an absolute value, if it is discriminated at said step (d) that the most significant bit of the calculated difference is "1".

In accordance with another aspect of the present invention, there is Provided an 8-bit absolute value calculation circuit comprising first to eighth subtraction means for subtracting a subtrahend from a minuend in the unit of bit; first to fourth signal selection means for selecting differences and borrows from said second, fourth, sixth and eighth subtraction means, respectively, according to borrows from said first, third, fifth and seventh subtraction means; fifth and sixth signal selection means for selecting differences and borrows from said second and fourth signal selection means, respectively, and differences from said third and seventh subtraction means, respectively, according to borrows from said first and third signal selection means; seventh signal selection means for selecting differences and borrows from said sixth signal selection means and differences from said fifth subtraction means according to borrows from said fifth signal selection means; eighth signal selection means for selecting differences from said first subtraction means, differences from said first signal selection means, differences from said fifth signal selection means and differences and borrows from said seventh signal selection means according to a higher-order one of the borrows from said seventh signal selection means; and signal calculation means for calculating a difference from said eighth signal selection means according to a most significant bit thereof to output an absolute value.

BRIEF DESCRIPTION OF THE DRAWINGS

The above and other objects, features and advantages of the present invention will be more clearly understood from the following detailed description taken in conjunction with the accompanying drawings, in which:

FIG. 7 is a truth table illustrating an 8-bit absolute value calculation operation in accordance with the present invention.

DETAILED DESCRIPTION OF THE INVENTION

Figure 1:
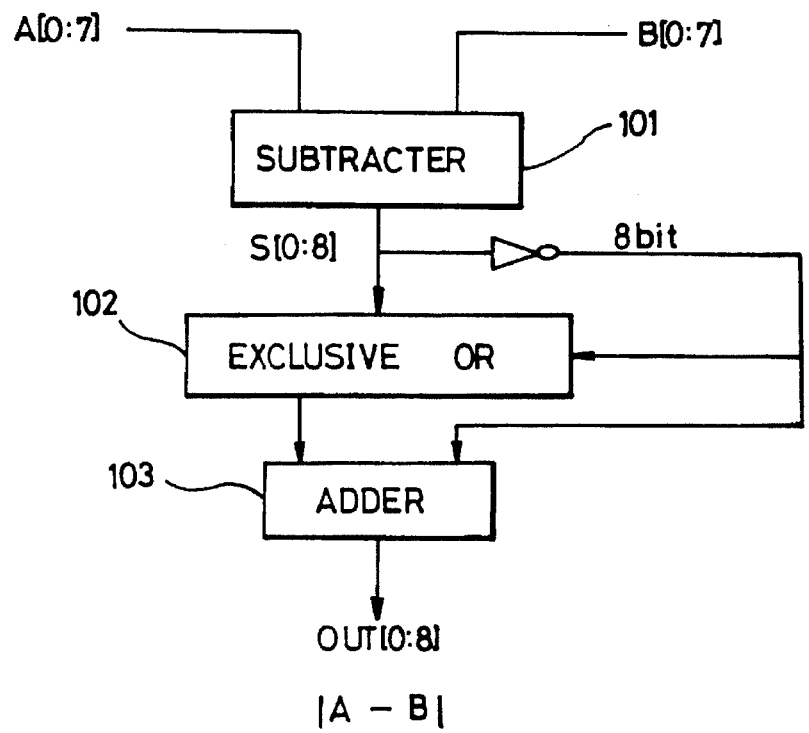
FIG. 1 is a block diagram of a conventional absolute value calculation circuit.
Figure 2:
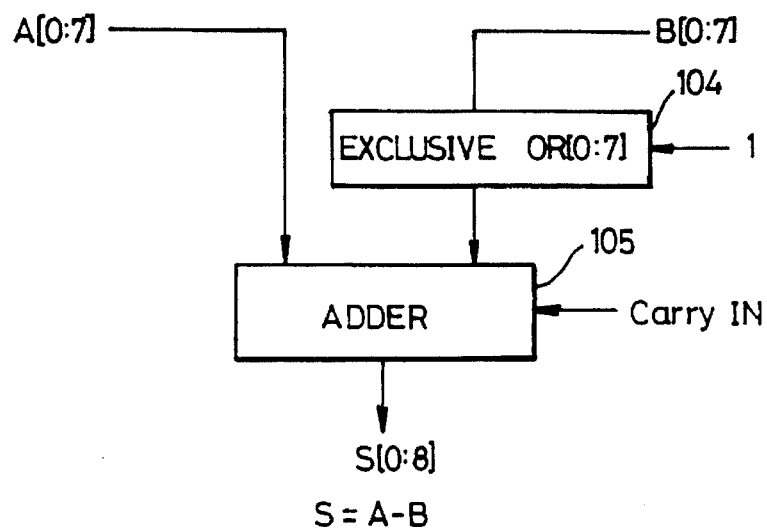
FIG. 2 is a block diagram of a subtracter in FIG. 1.
Figure 3:
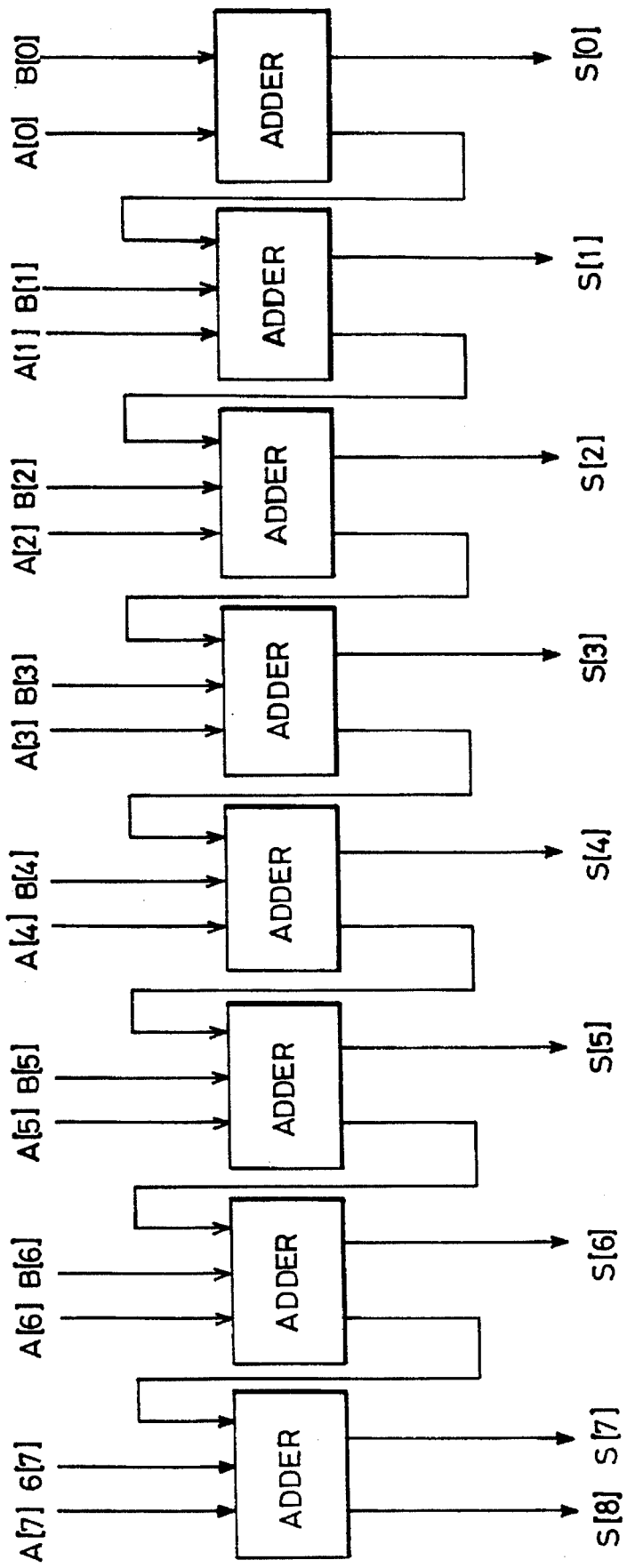
FIG. 3 is a block diagram of an adder in FIG. 2.
Figures 4, 5:
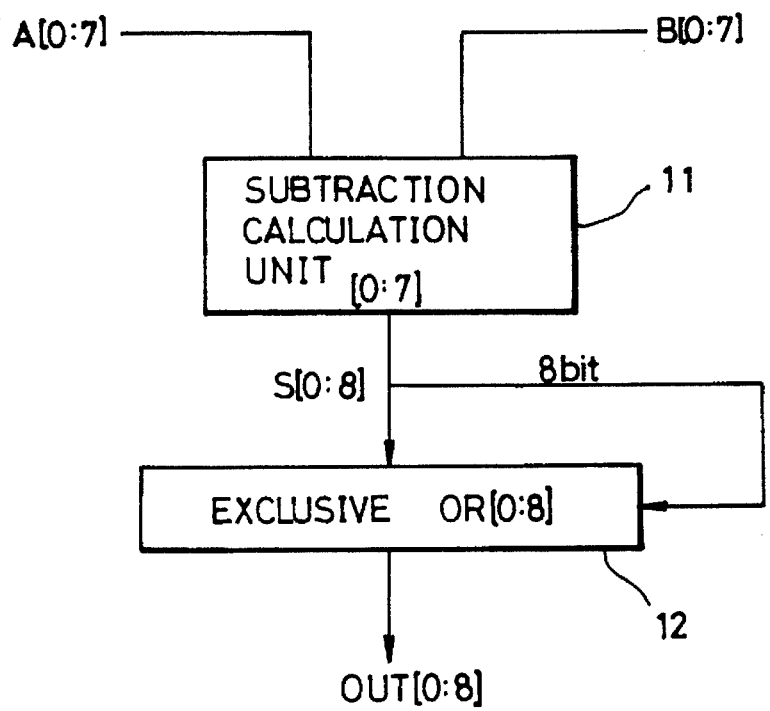
FIG. 4 is a block diagram of an absolute value calculation circuit in accordance with the present invention.
FIG. 5 is a truth table illustrating a subtraction algorithm in accordance with the present invention.
Figure 8:
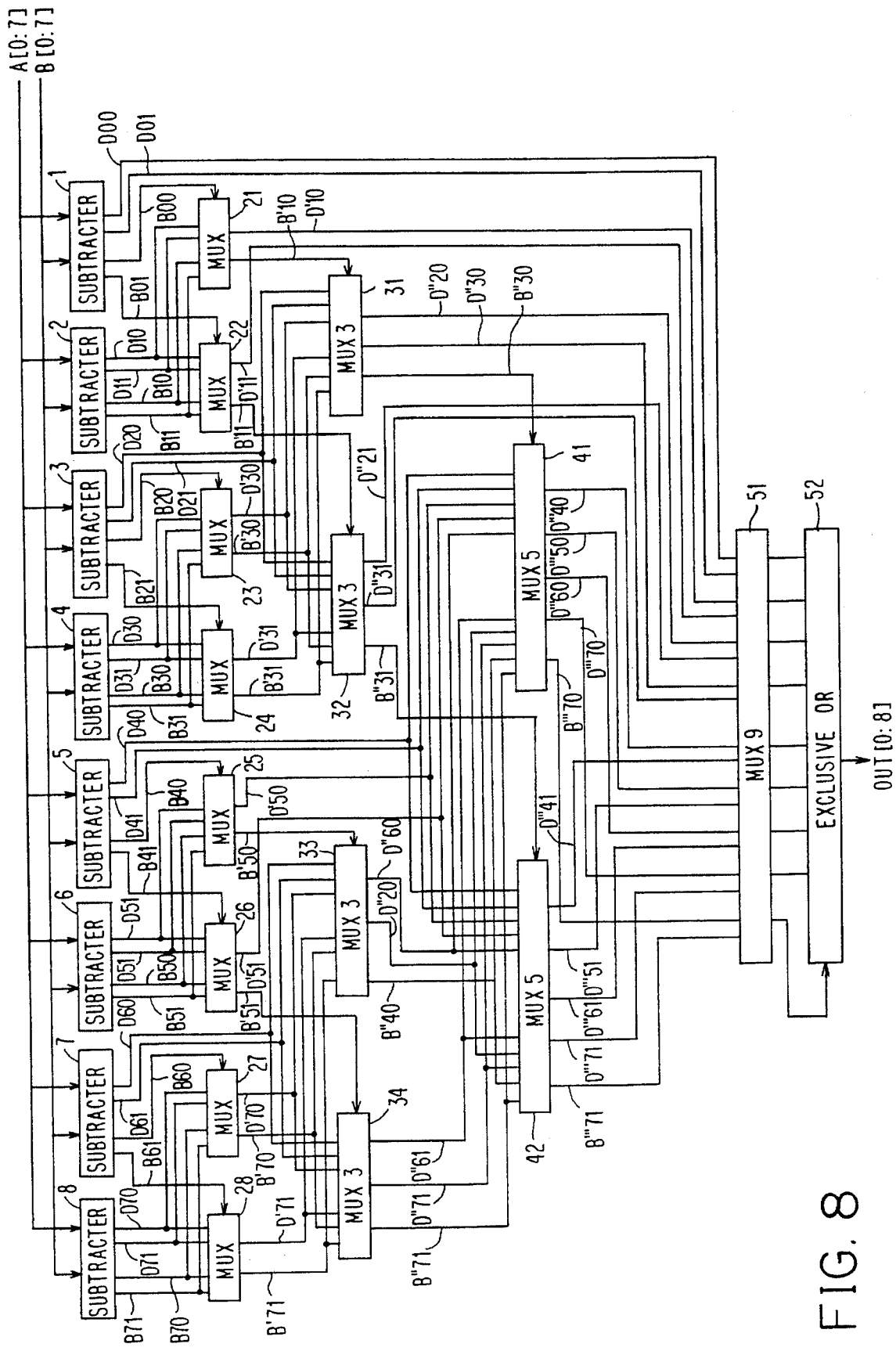
FIG. 8 is a circuit diagram of an embodiment of the absolute value calculation circuit for performing the 8-bit absolute value calculation operation in FIG. 7.

FIG. 4 is a block diagram of an 8-bit absolute value calculation circuit in accordance with the present invention and FIG. 8 is a circuit diagram of an embodiment of the 8-bit absolute value calculation circuit in accordance with- the present invention. As shown in FIG. 8, the 8-bit absolute value calculation circuit comprises subtracters 1–8 for subtracting a subtrahend B from a minuend A in the unit of bit, 4*2 multiplexers 21 and 22, 23 and 24, 25 and 26, and 27 and 28 for selecting differences and borrows from the subtracters 2, 4, 6 and 8 in the unit of bit, respectively, according to borrows from the subtracters 1, 3, 5 and 7, and 6*3 multiplexers 31 and 32, and 33 and 34 for selecting differences and borrows from the 4*2 multiplexers 23 and 24, and 27 and 28 in the unit of bit, respectively, and differences from the subtracters 3 and 7 in the unit of bit, respectively, according to borrows from the 4*2 multiplexers 21 and 22, and 25 and 26.

The 8-bit absolute value calculation circuit also comprises 10*5 multiplexers 41 and 42 for selecting differences and borrows from the 6*3 multiplexers 33 and 34 and differences from the subtracter 5 in the unit of bit, respectively, according to borrows from the 6*3 multiplexers 31 and 32, an 18*9 multiplexer 51 for selecting differences from the subtracter 1, differences from the 4*2 multiplexers 21 and 22, differences from the 6*3 multiplexers 31 and 32 and differences and borrows from the 10*5 multiplexers 41 and 42 in the unit of bit according to the borrow from the 10*5 multiplexer 42, and an exclusive OR gate 52 for exclusive-ORing an output of the 18*9 multiplexer 51 according to a most significant bit thereof to output an absolute value.

Figure 6:
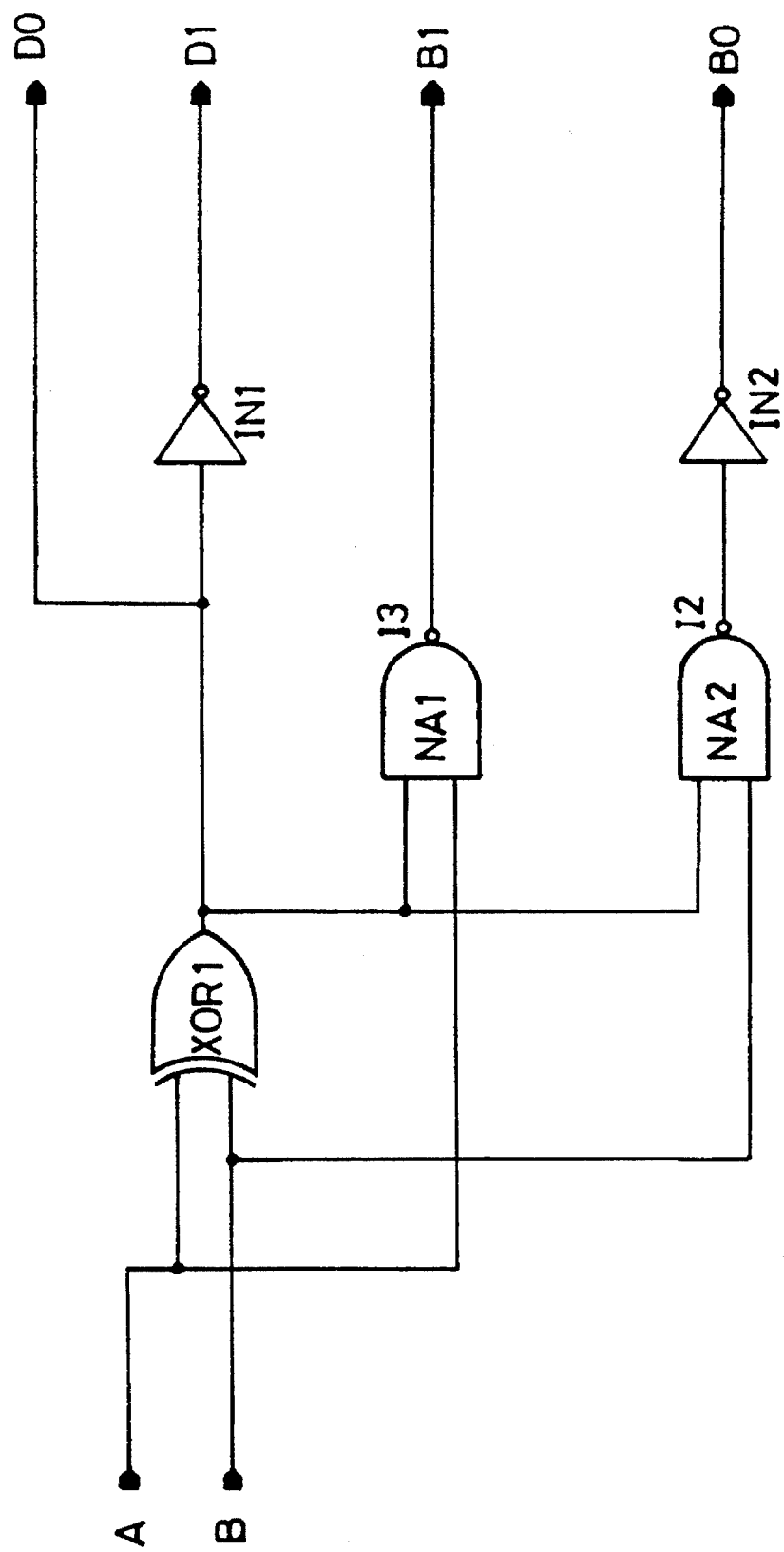
FIG. 6 is a circuit diagram of a subtracter for performing the subtraction algorithm in FIG. 5.

Each of the subtracters 1–8 includes, as shown in FIG. 6, an exclusive OR gate XOR1 for exclusive-ORing the minuend A and the subtrahend B to output a first difference D0, an inverter IN1 for inverting the first difference D0 from the exclusive OR gate XOR1 to output a second difference D1, a NAND gate NA2 for NANDing the subtrahend B and the first difference D0 from the exclusive OR gate XOR1, an inverter IN2 for inverting an output of the NAND gate NA2 to output a first borrow B0, and a NAND gate NA1 for NANDing the minuend A and the first difference D0 from the exclusive OR gate XOR1 to output a second borrow B1.

The operation of the embodiment of the 8-bit absolute value calculation circuit with the above-mentioned construction in accordance with the present invention will hereinafter be described in detail.

The present invention employs a subtraction algorithm subtracting the subtrahend directly from the minuend. In the subtraction algorithm, the differences D0 and D1 and the borrows B0 and B1 are obtained with respect to A and B as shown in a truth table of FIG. 5. Here, A and B are input bit values of the minuend and the subtrahend, respectively. D0 and B0 are the difference between the two input bit values and the borrow from a higher-order bit when a borrow is not given to a lower-order bit, respectively. D1 and B1 are the difference between the two input bit values and the borrow from a higher-order bit when a borrow is given to a lower-order bit, respectively.

For example, in the case where the input bit of the minuend A is "1" and the input bit of the subtrahend B is "0", the difference therebetween is "+1". As a result, the borrows B0 and B1 become "0" because there is no necessity for borrowing "1" from the higher-order bit. Also, even when the borrow is given to the lower-order bit, the difference D1 becomes "0" because there is no necessity for borrowing "1" from the higher-order bit.

In the case where the input bit of the minuend A is "0" and the input bit of the subtrahend B is "1", the difference therebetween is "−1". As a result, the borrows B0 and B1 become "1" because "1" must be borrowed from the higher-order bit. When the borrow is not given to the lower-order bit, the difference D0 becomes "1" because of b'10−b'01. On the contrary, when the borrow is given to the lower-order bit, the difference D1 becomes "0" because of D0−1.

In the case where the input bits of the minuend A and the subtrahend B are "0" and "0" or "1" and "1" the difference therebetween is "0". As a result, when the borrow is not given to the lower-order bit, the borrow B0 and the difference D0 become "0" because there is no necessity for borrowing "1" from the higher-order bit. On the contrary, when the borrow is given to the lower-order bit, the borrow B1 and the difference D1 become "1" because "1" must be borrowed from the higher-order bit.

The above-mentioned subtraction algorithm is performed by the circuit in FIG. 6. As shown in this drawing, the exclusive OR gate XOR1 exclusive-ORes the minuend A and the subtrahend B to output the difference D0. The inverter IN1 inverts the difference D0 from the exclusive OR gate XOR1 to output the difference D1. The NAND gate NA2 NANDs the subtrahend B and the difference D0 from the exclusive OR gate XOR1. The inverter IN2 inverts the output of the NAND gate NA2 to output the borrow B0. The NAND gate NA1 NANDs the minuend A and the difference D0 from the exclusive OR gate XOR1 to output the borrow B1.

For example, in the case where the input bit of the minuend A is "0" and the input bit of the subtrahend B is "1", the output of the exclusive OR gate XOR1 is "1". As a result, when the borrow is not given to the lower-order bit, the difference D0 becomes "1". Because a sign of the difference DO is negative (−), the output of the NAND gate NA2 becomes "0" which then inverted into "1" by the inverter IN2. In result, the borrow B0 from the higher-order bit becomes "1".

Also, the output D0 of the exclusive OR gate XOR1 is inverted into "0" by the inverter IN1. As a result, when the borrow is given to the lower-order bit, the difference D1 becomes "0". Since the output of the NAND gate NA1 becomes "1" the borrow B1 from the higher-order bit becomes "1".

Namely, the circuit in FIG. 6 is operated according to the input bit values of the minuend A and the subtrahend B to satisfy the truth table of FIG. 5.

By the way, in the case where the absolute value of the difference between the 8-bit minuend A and the 8-bit subtrahend B is to be obtained using the subtracter performing the above-mentioned subtraction algorithm, the output of the subtracter may have a negative (−) value. For this reason, a most significant bit of the output of the subtracter is checked to discriminate whether a one's complement of the output of the subtracter must be taken.

Namely, the most significant bit of the output of the subtracter indicates a sign of the difference between the 8-bit minuend A and the 8-bit subtrahend B. The multiplexer at the final stage inputs the most significant bit of the output of the subtracter to discriminate whether the one's complement of the output of the subtracter must be taken. As a result, the final absolute value is obtained in accordance with the discriminated result. Here, if the most significant bit is "1" it indicates that the output of the subtracter has the negative (−) value. On the contrary, if the most significant bit is "0", it indicates that the output of the subtracter has a positive (+) value.

The operation of the embodiment of the 8-bit absolute value calculation circuit will hereinafter be described in more detail with reference to FIG. 7, which is a truth table illustrating an 8-bit absolute value calculation operation in accordance with the present invention.

First, in the case where the subtraction algorithm is performed with respect to the 8-bit minuend A and the 8-bit subtrahend B, the subtracters 1–8 are connected corresponding to the respective bits of the 8-bit minuend A and the 8-bit subtrahend B, each of the subtracters 1–8 having the construction in FIG. 6.

Second, the eight subtracters 1–8 are coupled in the unit of two to form four pairs. The outputs of the four pairs of subtracters 1–8 are applied to the 4*2 multiplexers 21 and 22, 23 and 24, 25 and 26, and 27 and 28, respectively. For example, the multiplexers 21 and 22 input the outputs B10, D10, B11 and D11 of the subtracter 2 at their input terminals, simultaneously, and the borrows B00 and B01 of the subtracter 1 at their control terminals, respectively, and provide two pairs of outputs B'10–D'10 and B'11–D'11. The multiplexers 23 and 24, 25 and 26, and 27 and 28 are operated in a similar manner to those of the multiplexers 21 and 22.

Third, the eight subtracters 1–8 are coupled in the unit of four to form two pairs. Namely, the multiplexers 31 and 32 input the outputs D20 and D21 of the subtracter 3 and the outputs B'30 and D'30 of the multiplexer 23 and the outputs B'31 and D'31 of the multiplexer 24 at their input terminals, simultaneously, and the borrows B'10 and b'11 of B'10 and B'11 of the multiplexers 21 and 22 at their control terminals, respectively, and select the inputted values in the unit of bit according to the borrows B20 and B21 of the subtracter 2. As a result, the multiplexers 31 and 32 provide two pairs of outputs D"20–D"30–B"30 and D"21–D"31–B"31. Similarly, the multiplexers 33 and 34 input the outputs of the subtracters 7 and the outputs of the multiplexers 27 and 28 and provide their outputs according to the borrows of the multiplexers 25 and 26.

Fourth, the eight subtracters 1–8 are coupled in a single pair. Namely, the multiplexers 41 and 42 input the outputs D40 and D41 of the subtracter 5, the outputs D'50 and D'51 of the multiplexers 25 and 26, respectively, the outputs D"60 and D"61 of the multiplexers 33 and 34, respectively of the subtracter 7 and the outputs D"70 and B"70 of the multiplexer 33 and D"71 and B"71 of the multiplexer 34 at their input terminals, simultaneously, and the borrows B"30 and B"31 of the multiplexers 31 and 32 at their control terminals, respectively, and select the inputted values in the unit of bit according to the borrows B"30 and B"31 of the multiplexers 31 and 34. As a result, the multiplexers 41 and 42 provide two pairs of outputs D"40–D"50–D"60–D"70–B"70 and D"41–D"51–D"61–D"71–B"71.

Finally, the multiplexer 51 inputs the outputs of the subtracters 1–8 and selects the inputted values in the unit of bit according to the borrow B"70 of the multiplexer 41 or the borrow B'"70 of the multiplexer 42. Then, the final output value is obtained according to a borrow of the multiplexer 51 or a most significant bit of the output thereof. Namely, the final output value is calculated according to whether the borrow of the multiplexer 51 is "1" or "0". If the borrow of the multiplexer 51 is "1", the output value is smaller by "1" than the original value. In this case, the exclusive OR gate 52 takes the one's complement of the output of the multiplexer 51 to take the two's complement of the original value. As a result, the final output value or the absolute value is obtained.

As apparent from the above description, according to the present invention, one subtracting operation and one one's complement taking operation can solve two one's complement taking operations and three addition operations required in the conventional absolute value calculation circuit. Therefore, the absolute value calculation time and the chip area can significantly be reduced, thereby enabling a high-speed absolute value calculation operation. In other words, the present invention does not require the exclusive OR gate and the adder for the subtraction operation and the adder for the absolute value calculation at the final stage. This has the effect of reducing the chip area. Also, there is no necessity for taking the two's-complement in the subtraction operation and for adding "1" to the one's complement in the final absolute value calculating stage. Therefore, the calculation speed can be enhanced.

Although the preferred embodiments of the present invention have been disclosed for illustrative purpose's, those skilled in the art will appreciate that various modifications, additions and substitutions are possible, without departing from the scope and spirit of the invention as disclosed in the accompanying claims.

What is claimed is:

1. An 8-bit absolute value calculation circuit comprising:

first to eighth subtraction means for subtracting a subtrahend from a minuend in the unit of bit, wherein each of said first to eighth subtraction means outputs first and second differences and first and second borrows, said first and second differences being "1" and "0", respectively, if the subtrahend and the minuend are the same, whereas "0" and "1", respectively, if the subtrahend and the minuend are not the same, said first and second borrows being both "0" if the minuend is larger than the subtrahend, "1" and "0" respectively, if the subtrahend and the minuend are the same and both "1" if the minuend is smaller than the subtrahend;

first to fourth signal selection means for selecting differences and borrows from said second, fourth, sixth and eighth subtraction means, respectively, according to borrows from said first, third, fifth and seventh subtraction means;

fifth and sixth signal selection means for selecting differences and borrows from said second and fourth signal selection means, respectively, and differences from said third and seventh subtraction means, respectively, according to borrows from said first and third signal selection means;

seventh signal selection means for selecting differences and borrows from said sixth signal selection means and differences from said fifth subtraction means, respectively, according to borrows from said first and third signal selection means;

eighth signal selection means for selecting differences from said first subtraction means, differences from said first signal selection means, differences from said fifth signal selection means and differences and borrows from said seventh signal selection means according to a higher-order one of the borrows from said seventh signal selection means; and signal calculation means for calculating a difference from said eighth signal selection means according to a most significant bit thereof to output an absolute value.

2. An 8-bit absolute value calculation circuit as set forth in claim 1, wherein each of said first to eighth subtraction means includes:

an exclusive OR gate for exclusive-ORing the minuend and the subtrahend to output the first difference;

a first inverter for inverting the first difference from said exclusive OR gate to output the second difference;

a first NAND gate for NANDing the subtrahend and the first difference from said exclusive OR gate;

a second inverter for inverting an output of said first NAND gate to output the first borrow; and a second NAND gate for NANDing the minuend and the first difference from said exclusive OR gate to output the second borrow.

3. An 8-bit absolute value calculation circuit as set forth in claim 1, wherein each of said first to fourth signal selection means includes first and second multiplexers for selecting the differences and borrows from a corresponding one of said second, fourth, sixth and eighth subtraction means in the unit of bit, respectively, according to first and second borrows from a corresponding one of said first, third, fifth and seventh subtraction means.

4. An 8-bit absolute value calculation circuit as set forth in claim 3, wherein said first and second multiplexers are 4*2 multiplexers.

5. An 8-bit absolute value calculation circuit as set forth in claim 4, wherein each of said first and second multiplexers selects output terminals of "1" if a corresponding one of the first and second borrows is "1", whereas output terminals of "0" if the corresponding one of the first and second borrows is "0", to output the corresponding differences and borrows.

6. An 8-bit absolute value calculation circuit as set forth in claim 1, wherein each of said fifth and sixth signal selection means includes first and second multiplexers for selecting the differences and borrows from a corresponding one of said second and fourth signal selection means and the differences from a corresponding one of said third and seventh subtraction means in the unit of bit, respectively, according to first and second borrows from a corresponding one of said first and third signal selection means.

7. An 8-bit absolute value calculation circuit as set forth in claim 6, wherein said first and second multiplexers are 6*3 multiplexers.

8. An 8-bit absolute value calculation circuit as set forth in claim 1, wherein said seventh signal selection means includes first and second multiplexers for selecting the differences and borrows from said sixth signal selection means and the differences from said fifth subtraction means in the unit of bit, respectively, according to first and second borrows from said fifth signal selection means.

9. An 8-bit absolute value calculation circuit as set forth in claim 8, wherein said first and second multiplexers are 10*5 multiplexers.

10. An 8-bit absolute value calculation circuit as set forth in claim 1, wherein said eighth signal selection means includes an 18*9 multiplexer for selecting the differences from said first subtraction means, the differences from said first signal selection means, the differences from said fifth signal selection means and the differences and borrows from said seventh signal selection means in the unit of bit according to the higher-order borrow from said seventh signal selection means.

11. An 8-bit absolute value calculation circuit as set forth in claim 1, wherein said signal calculation means includes an exclusive OR gate for taking a one's complement of the difference from said eighth signal selection means according to the most significant bit thereof.

12. An 8-bit absolute value calculation circuit as set forth in claim 11, wherein said exclusive OR gate takes the one's complement of the difference from said eighth signal selection means to calculate the absolute value, if the most significant bit thereof is "1".

* * * * *